Figure 1:
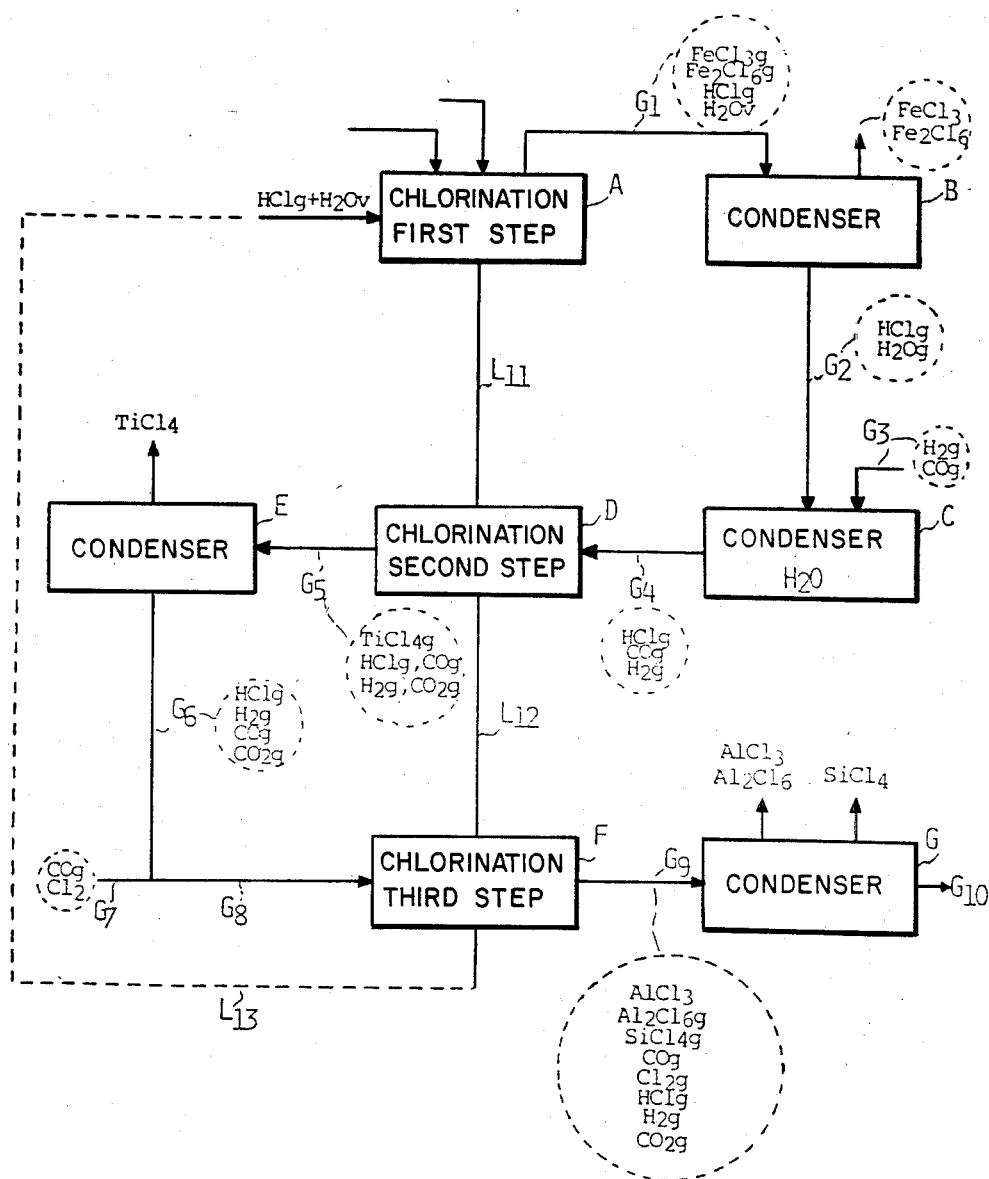

United States Patent [19]

Séon et al.

[11] Patent Number: 4,563,338

[45] Date of Patent: Jan. 7, 1986

[54] SELECTIVE CHLORINATION METHOD FOR MIXTURES OF METALLIC OXIDES OF NATURAL OR SYNTHETIC ORIGIN

[75] Inventors: Francoise Séon, Montreuil; Gérard Picard, Charenton-le-Pont; Bernard Tremillon, Bures sur Yvette; Yves Bertaud, Saint Jean de Maureienne, all of France

[73] Assignee: Aluminium Pechiney, Paris, France

[21] Appl. No.: 504,037

[22] PCT Filed: Sep. 29, 1982

[86] PCT No.: PCT/FR82/00160

§ 371 Date: May 25, 1983

§ 102(e) Date: May 25, 1983

[87] PCT Pub. No.: WO83/01249

PCT Pub. Date: Apr. 14, 1983

[30] Foreign Application Priority Data

Oct. 1, 1981 [FR] France .................. 81 18825

[51] Int. Cl.[4] .............. C01B 33/08; C01F 7/60; C01G 23/02; C01G 49/10

[52] U.S. Cl. ................ 423/76; 423/135; 423/136; 423/149; 423/343; 423/492; 423/493; 423/496; 423/DIG. 12

[58] Field of Search ............ 423/76, 79, 136, 149, 423/210.5, 341, 343, 492, 493, 495, 496, DIG. 12, DIG. 9, 135

[56] References Cited

U.S. PATENT DOCUMENTS

| 1,858,272 | 5/1932 | Jenness ................. | 423/135 |
|---|---|---|---|
| 1,875,105 | 8/1932 | Muggleton et al. ........ | 423/136 |
| 1,982,194 | 11/1934 | Brode et al. ........... | 423/76 |
| 2,387,228 | 10/1945 | Arnold ................. | 423/135 |
| 2,870,073 | 1/1959 | Merlub-Sobel et al. ..... | 423/492 |
| 3,067,012 | 12/1962 | Seltzer et al. .......... | 423/343 |
| 4,035,169 | 7/1977 | Sebenik et al. ......... | 423/495 |
| 4,039,648 | 8/1977 | Haupin et al. .......... | 423/496 |
| 4,252,774 | 2/1981 | Loutfy et al. .......... | 423/76 |
| 4,288,411 | 9/1981 | Holland et al. ......... | 423/76 |
| 4,425,311 | 1/1984 | Weston ................. | 423/343 |

FOREIGN PATENT DOCUMENTS

| 628953 | 4/1936 | Fed. Rep. of Germany . | |
|---|---|---|---|
| 1126225 | 11/1956 | France . | |
| 2334625 | 7/1977 | France ................. | 423/496 |
| 2338899 | 8/1977 | France ................. | 423/496 |
| 2415663 | 8/1979 | France ................. | 423/343 |
| 2432992 | 3/1980 | France ................. | 423/76 |
| 2457256 | 12/1980 | France ................. | 423/495 |
| 2479176 | 10/1981 | France ................. | 423/496 |

Primary Examiner—John Doll
Assistant Examiner—Jeffrey E. Russel
Attorney, Agent, or Firm—McDougall, Hersh & Scott

[57] ABSTRACT

A selective chlorination method of a mixture of simple or complex metallic oxides, comprising at least one of the elements to be used, iron, aluminum, titanium and silicon, as well as the impurities accompanying said elements, said method consisting of a grinding, a calcination, a placing in suspension in a bath of melted salts of the mixture of said metallic oxides and of their impurities and of an introduction of chlorinating agents into said bath maintained at a temperature which assures the volatility of at least one of the metallic chlorides formed; characterized by the fact that, in order to selectively extract the metallic chlorides formed from the bath, specific chlorinating mixtures are introduced into this bath by successive steps, said mixtures having increasing chlorinating power, and the introduction is in a number at the most equal to the usable elements to be chlorinated. This method is applied specifically to clays, bauxites, kaolins oil or bituminous shales, red sludges, oxide concentrates, anorthosite, feldspath and ilmenite.

18 Claims, 1 Drawing Figure

SELECTIVE CHLORINATION METHOD FOR MIXTURES OF METALLIC OXIDES OF NATURAL OR SYNTHETIC ORIGIN

The present invention relates to a selective method of chlorination in baths of melted salts, by means of gaseous chlorinating mixtures, of mixtures of metallic, simple or complex oxides, of natural origin, such as ores; or of synthetic origin, such as red sludges or other concentrates of metallic oxides, comprising at least one of the elements to be used, aluminum, titanium, iron and silicon, as well as the impurities accompanying the aforementioned elements, which will lead to obtaining isolated metallic chlorides of high purity.

It has been known for a long time already to produce metallic chlorides in baths of melted salts by chlorination of metallic oxides or ores containing same, by means of a source of chlorine, in the presence of a reducing agent.

In fact, the economic importance of industrially obtaining metallic chlorides, and, more particularly, of aluminum chloride for catalytic applications or for the electrolytic production of metal, such as aluminum, led the person skilled in the art to conduct profound research in this field. Thus, numerous procedures have been described in the specialized literature, which relate to the production methods for anhydrous metallic chlorides by carbochlorination in baths of melted salts of metallic oxides or of ores containing same.

One first document, for example the French Pat. No. 1,126,225, describes the reaction of material containing titanium, such as rutile, ilmentite or titanium oxide powder, with gaseous chlorine in the presence of a reducing agent, inside a bath of melted salts constituted by a mixture of alkali metal and/or alkaline earth metal choride and/or floride at a temperature above the melting point of the mixture of the metallic halides (from 850° to 900° C.), thereby assuring the production of titanium chloride.

Another document, French Pat. No. 2,334,625, proposes a method for obtaining anhydrous aluminum chloride by carbochlorination of an aluminous ore, and, more precisely of alumina, in a bath of melted salts. This method consists of reacting in a bath of melted salts formed by at least one alkali metal and/or alkaline earth chloride and aluminum chloride, an alumina source, with a chlorine source in the presence of a non-gaseous reducing agent, such as carbon. Anhydrous aluminum chloride is recovered under a gaseous form at the outlet of the bath, simultaneously with the escape gases, in order to be condensed for this effect in a cooled zone.

However, and this is an inconvenience, the obtaining of anhydrous metallic gases in baths of melted salts according to the methods described in the above-cited literature, demands the presence and intervention of a reducing agent to assure the transformation of the metallic oxide into a chloride according to the reaction of carbochlorination, like the one, for example, concerning alumina:

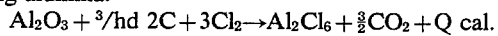

Such a reducing agent is in most cases in solid form, but may be in liquid or gaseous form.

When in solid form, this reducing agent preferably is carbon, but it may be selected from among other reducing agents, such as sulfur, for example. When the reducing agent is carbon, it originates from the usual sources well known to the person skilled in the art, that is to say carbons, petroleum and their derivates. This agent is put into operation after possibly having undergone a purification treatment as well as a grinding treatment, so that it is present in the aspect of solid particles of small dimensions, close to those of the metallic oxide intended for the carbochlorination.

Thus, the bath of melted salts used for the charbochlorination is fed, as a rule, by means of metallic oxide powder and carbon, having a substantially identical average particle size, requiring a prior crushing of these two materials. However, under a more elaborate method, the specialized literature suggests to even feed the bath of melted salts by means of mixed agglomerates formed from metallic oxide and the reducing agent, such as carbon or its derivatives; the formation of the agglomerates being obtained for example by pressing, spinning or granulation in the groove of a more or less pasty mixture of both components, by using a generally liquid binder, such as water, oil drops or petroleum, then by heat treatment of the granules obtained, at a temperature corresponding to the applicaton for which they are intended.

However, the reducing agent as it has been described, also may be in liquid or gaseous form, under the normal conditions of temperature and pressure. Such is the case for example with phosgene ($COCl_2$) and carbon tetrachloride ($CCl_4$) which, under the operating conditions of the bath of melted salts, are at the same time sources of reducing agent and of chlorine by virtue of their thermal decomposition or of the reactional phenomena which are produced. Such is the case with carbon monoxide (CO), a reducing agent of gaseous origin, which is introduced in stoichiometric mixture with the chlorine in the bath of melted salts to constitute the gaseous mixture of carbochlorination of the metallic oxide concerned.

Furthermore, and this is another inconvenience, the obtaining of anhydrous metallic chloride by carbochlorination of a metallic oxide in a bath of melted salts demands a bath temperature, which in the majority of cases is very high, generally exceeding the temperature of 700° C., in order to attain temperatures on the order of 800° C.–850° C., in order to have available a suitable reactional kinetic.

At this temperature, the necessary thermal energy is very important and requires nobler fuels, that is, fuels with greater calorific power than the poor recovery gases. Furthermore, at this temperature, the refractory linings of the carbochlorination reactors are subject to much more wear and by the same token, their lifetime is short. Finally, at these temperatures, the baths of melted salts may present high vapor tensions which would require costly and complex collecting, treatment and recycling installations of these effluents.

Besides the above-mentioned inconveniences, another one manifests itself as soon as the chlorination by carbochlorination in a bath of melted salts is carried out on a natural ore, that is on a mixture of various metallic oxides and not on a single metallic oxide drawn from an ore by a chemical extraction method. Thus, for example, the carbochlorination method of aluminum oxide described in the French Pat. No. 2,334,625, recommends as preferred source of aluminum oxide, purified alumina extracted from bauxite by the Bayer method, while the other insoluble compounds, such as iron, titanium and silicon, are eliminated.

However, since this source of aluminum oxide is a natural ore, such as kaolin, bauxite, or an oil shale, it is obvious to the man skilled in the art that the use of such a source for the production of aluminum chloride by carbochlorination in baths of melted salts leads to obtaining a gaseous mixture of metallic chlorides. This mixture, in which one of the chlorides may predominate, such as aluminum chloride when bauxite is used, also contains the chlorides of other metals present in the ore as impurities, such as, for example silicon ($SiCl_4$), titanium ($TiCl_4$) and iron chloride ($FeCl_3$ and $Fe_2Cl_6$), when the ore is bauxite.

To isolate the metallic chloride to be preferred, for example the aluminum chloride, from such a mixture of gaseous metallic chlorides, it is fundamental to have available a method allowing for their separation.

In order to allow for the realization of this separation, the specialized literature has discovered various procedures, particularly methods practicing the selective condensation or the fractionated distillation of the metallic chlorides from their mixture.

Such a method is described, for example in the U.S. Pat. No. 2,387,228 which suggests extracting the titanium ($TiCl_4$) and silicon ($SiCl_4$) chlorides from a mixture which also contains aluminum ($AlCl_3$ and $Al_2Cl_6$) and iron chlorides ($FeCl_3$ and $Fe_2Cl_6$), a method which consists of heating the mixture above the boiling point of the silicon and titanium chlorides, in order to remove therefrom in gaseous form the above mentioned chlorides and to separate them thanks to the important difference of boiling at atmospheric pressure. The aluminum and the ferric chloride mixture is collected in the form of a solid residue which in turn may be subjected to a fractionated distillation under pressure, making it possible to separate the gaseous aluminum chloride from the liquid ferric chloride Another method of separation by fractionated distillation of the aluminum chloride from a gaseous mixture containing this chloride and other metallic chlorides is described in the French Pat. No. 2,457,256. The method consists of subjecting the mixture of gaseous chlorides to a certain number of fractionated distillation phases by using an assembly of distillation columns and by maintaining a sufficient quantity of titanium chloride ($TiCl_4$) in operation in the entire column, so as to separate at least one metallic chloride, including silicon chloride, from a mixture of gases containing aluminum chloride and titanium chloride, silicon and ferric iron chloride, the entire column operating at temperatures which comprise the sublimation or melting points of the aluminum chloride at operating pressure, so that the solidification of the chloride will be impeded in the columnmn.

Nevertheless, in spite of the improvements applied both in the area of the fractionated distillation and in that of the selective condensation in order to separate for example the aluminum chloride from a mixture of gases containing other metallic chlorides, still certain inconveniences seem to be present which may render the exploitation of such separation methods uninteresting. For example, the phenomenon of desublimation of the aluminum chloride from the gaseous to the solid state is known. which may disturb one phase of fractionated distillation or render it impossible by occlusion.

Furthermore, the obtaining of pure products, that is to say well separated products, requires very elaborate and, by the same token, very expensive facilities.

In fact, in spite of the differences of boiling temperatures between $FeCl_3$, $Fe_2Cl_6$ and $AlCl_3$, $Al_2Cl_6$ which apparently are sufficient to separate them by condensation, a hexachlorinated complex of iron and aluminum frequently forms of the same volatility as the aluminum chloride, and it is very difficult to separate the latter. The ferric chloride then becomes a contaminating element of the aluminum chloride because it can no longer be separated therefrom in a sufficiently selective manner by condensation. And, from that point on, this contaminated aluminum chloride can no longer be used in the production processes of the aluminum.

Finally, even if it appears to be reasonably possible to carry out such a separation of the aluminum, titanium, iron and silicon chlorides from a gaseous mixture originating from the carbochlorination of an ore such as bauxite, frequently it turns out to be poorly exploitable for economic reasons because, in general, although such products are directed toward obtaining only one single chloride to be used, in fact a mixture of metallic chlorides is produced which considerably increases the consumption of the chlorination chlorides in relation to the strictly necessary consumption for the production of the sought chloride.

That is why other types of carbochlorination methods are proposed in the specialized literature, using other manners of separations of the obtained metallic chlorides. U.S. Pat. No. 4,252,774 illustrates one particular method. According to this method, it is possible to produce aluminum chloride from an ore containing aluminum, as well as iron, titanium and silicon in oxidized form by carbochlorination in a bath of melted salts.

The effluent gaseous mixture containing aluminum, iron, titanium and silicon chlorides, as well as carbon monoxide then is frozen to condense the aluminum chloride and the ferric chloride, while the titanium and silicon chlorides remain in gaseous phase in order to carry out a further separation. The condensed mixture of aluminum and iron chlorides is then brought to the temperature of the formation of a gaseous phase constituted by the mixture of said chlorides, then said gaseous phase is put in contact with an aluminum sulphite causing the precipitation of iron sulfides and the additional formation of gaseous aluminum chloride, allowing for easy separation of the aluminum chloride.

However, such a method can only be applied economically to the carbochlorination of an aluminous ore of the type rich in aluminum and as poor as possible in other elements such as iron, titanium and silicon; in other words, it is essentially directed toward the carbochlorination of the bauxites. In fact, once this method attains the separation phase of the aluminum and iron chlorides, it demands the consumption of a quantity of aluminum sulfide which is the higher depending on the quantity of $FeCl_3$ and $Fe_2Cl_6$, the preparation of which requires a pure alumina originating for example from the Bayer method.

However, while this method is economically unfavorable because it consumes pure alumina, it also is necessary to state that the obtained aluminum chloride is of insufficient purity.

Aware of the interest a method for obtaining metallic chlorides by chlorination in baths of melted salts of mixtures of metallic oxides of natural or synthetic origin may present to the person skilled in the art, but also aware of the inconveniences attached to the methods described above in the specialized literature, applicants, in pursuit of their research, have discovered and put into operation a method of selective chlorination in baths of melted salts without the need of having to resort to both complex and expensive solutions.

According to the invention the selective chlorination method of a mixture of simple or complex metallic oxides, of natural or synthetic origin, comprising at least one of the elements to be used, aluminum, titanium, iron and silicon, as well as the impurities accompanying the mentioned elements, in suspension in a bath of melted salts, by means of chlorinating agents, at a temperature of the bath assuring the volatility of at least one of the formed metallic chlorides, is characterized by the fact that in order to successively extract from the bath, the metallic chlorides formed, specific chlorinating mixtures of increasing chlorinating power are introduced successively into the bath, in a number at least equal to the usable elements to be chlorinated and present in the form of metallic oxides in said mixture subjected to chlorination.

Within the scope of the invention and for the remainder of its description, simple oxide is defined as being a component containing the metal in question and the oxygen. Complex oxide is a component containing in addition to the metal and the oxygen, either another metal or a halide, illustrative examples of which are aluminate, silicon aluminate, ilmenite, oxychloride or hydrated chloride.

Likewise, the term chlorinated mixture shall mean a mixture of at least two gases, one of which contains chlorine in various degrees of oxidation during the course of the reaction.

Finally, it is considered hereinafter that a chlorinating mixture is all the more powerful, when it is able to assure the chlorination of a metallic oxide of higher thermodynamic stability notwithstanding the chlorination of other oxides of lower stability.

The bath of melted salts used within the framework of the invention, the components of which have been widely disclosed in the special literature, is generally composed of a mixture of at least one alkaline and/or alkaline earth halide. Among the halides which may be introduced, it has been noted as desirable to use the alkaline and/or alkaline earth metal chlorides, preferably lithium, sodium, potassiuim chlorides, as well as calcium, barium and magnesium chloride, and, possibly, aluminum chloride.

The temperature of the bath of melted salts intended for the carbochlorination according to the invention, is located between its melting point and its boiling point under the conditions of utilization. Applicants have discovered that the range of temperatures applied was located, preferably, between 350° and 750° C., and more specifically between 450° and 650° C.

Thanks to numerous experimentations by injecting various gaseous chlorination mixtures into said baths of melted salts in which the metallic oxides are found in suspension, applicants have been able to demonstrate and then compare the chlorinating powers of various gaseous mixtures, finally to determine their selective nature in function of the thermodynamic stability of the metallic oxides to be chlorinated, and in particular, of the thermodynamic stability of the ones enumerated above.

Tables I and II indicate for each metallic oxide in question, classified in an order of increasing stability, the selective chlorinating mixture in a bath of melted salts, constituted by the eutectic LiCl-KCl as well as the partial application pressures for each one of the gases involved in the chlorinating mixture.

Now, the metallic oxide mixtures, of natural or synthetic origin, intended for chlorination, may possibly contain a reactive alumina or a compound such as an aluminum hydrate or an aluminate which may bring about a reactive alumina under the chlorination conditions.

During numerous chlorination experiments, your applicant noted that the presence of such a reactive alumina within the bath of melted salts led to the simultaneous departure of aluminum chloride and ferric chloride, due to the comparable nature of the thermodynamic stability of both oxides.

That is why Table I (attached) resembled the general conditions of the selective chlorination method according to the invention regarding the metallic oxide mixtures of natural or synthetic origin, initially exempt from reactive alumina and/or not leading to its formation in the melted salt bath, while Table II (attached), a variant of the method according to the invention, compiles the special conditions of selective chlorination, when the metallic oxide mixtures contain reactive alumina leading to its formation within the melted salt bath.

According to Table I, the selective chlorination method of a mixture of simple or complex oxides, of natural or synthetic origin, comprising at least one of the elements to be utilized, aluminum, titanium, iron and silicon, as well as the impurities accompanying the aforementioned elements, but exempt from reactive alumina and/or of components which may give rise to said alumina consists first of all to finely grind said oxide mixture, then to place it in suspension in the melted salt bath maintained at the desired temperature.

The selective chlorination of the thermodynamically less stable oxide, that is to say the ferric oxide $Fe_2O_3$ contained in the mixture of the metallic oxides is carried out without chlorination of the titanium, aluminum and silicon oxides, with the aid of either one of the two chlorinating mixtures of the following nature and compositions, one being:

—HCl gas+$H_2O$ vapor, for which the partial pressure of the hydrogen chloride P(HCl) ranges between 0.1 and 1 bar, but preferably between 0.7 and 1 bar and the partial water vapor pressure P($H_2O$) is lower than or at the most equal to 0.1 times the partial pressure of HCL [$0.1 \times P(HCl)$] the other one being —$Cl_2$ gas+$O_2$ gas+HCl gas for which the partial pressure of the chlorine P($Cl_2$) ranges between 0.1 and 1 bar, but preferably between 0.7 and 1 bar, while the partial oxygen pressure P($O_2$) is lower than or equal to 0.1 bar, and preferably lower than or at the most equal to 0.001 bar, and that the partial pressure of the hydrogen chloride P(HCl) may be below 0.01 bar, but preferably it is equal to 0.01 bar.

Then the selective chlorination of titanium oxide is effected from the bath of molten salt which no longer contains ferric oxide, by means of the chlorinating mixture with the following nature and compositions:

HCl gas+CO gas+$H_2$ gas for which the partial pressure of the hydrogen chloride P(HCl) ranges between 0.45 and 0.8 bar, the partial pressure of the carbon monoxide P(CO) ranges between 0.45 and 0.1 bar, and the partial pressure of hydrogen ranges between 0.05 and 0.15 bar, and preferably equal to 0.1 bar.

Finally, the chlorination of alumina and silicon is effected from the bath of melted salts which no longer contains either ferric oxide or titanium oxide, by means of either one of the two chlorination mixtures of the following nature and composition, the one being:

—Cl$_2$ gas+CO gas+HCl gas, for which the partial pressure of the chlorine P(Cl$_2$) and of the carbon monoxide (CO) range between 0.01 and 0.5 bar, and the partial pressure of the hydrogen chloride is below 1 bar, the other one being:

—COCl$_2$ gas+HCl gas, for which the partial pressure of the phosgene P(COCl$_2$) ranges between 0.01 bar and 1 bar and the partial pressure of the hydrogen chloride is below 1 bar, the additional separation of AlCl$_3$ along with SiCl$_4$ being effected easily by condensation in view of the very great spread existing between the sublimination and boiling temperatures of these two chlorides. AlCl$_3$: 183° C. and SiCl$_4$: 57.6° C.

According to Table II, a variant of the method according to the invention, the selective chlorination relates to a mixture of simple or complex oxides, of natural or synthetic origin, including stable alumina such as alpha or gamma alumina, for example, at least one of the elements to be used, iron, titanium and silicon and reactive alumina and/or a compound leading to its formation, as well as the impurities accompanying the above-mentioned elements.

According to this variant, the chlorination of the reactive alumina and of the ferric oxide, and the extraction of the only aluminum chloride originating from the reactive alumina are carried out while the iron remains in solution in the bath in the form of ferrous chloride.

The chlorination mixture being used in this case is of the following nature and composition:

HCl gas+H$_2$ gas for which the partial pressure of the hydrogen chloride P(HCl) ranges between 0.1 and 1 bar, preferably between 3 and 0.9 bar, and the partial hydrogen pressure P(H$_2$) ranges between 0.01 and 0.9 bar, and preferably between 0.05 and 0.2 bar.

The iron maintained in solution in the bath in the form of ferrous chloride is converted into ferric chloride and extracted in this latter form by means of the gaseous mixture of the following nature and composition:

Cl$_2$ gas+O$_2$ gas for which the partial pressure P(Cl$_2$) ranges between 0.01 and 1 bar, preferably between 0.7 and 1 bar, and that of the oxygen P(O$_2$) is less than and at the most equal to 0.1 bar, preferably less than and at the most equal to 0.01 bar.

The following phases of selective chlorination of the titanium oxide, then of alumina and silica are identical with the ones previously described in the selective chlorination method according to Table I.

Under the method according to the invention and its variant, the sum of the partial pressures of each component of the gaseous mixtures generally is equal to the operating pressure, that is to the pressure under which the metallic chlorides formed are extracted. In the contrary case, the operating pressure may be attained thanks to the use of an inert gas such as nitrogen.

Thus, all the gaseous mixtures used for the selective chlorination of a mixture of metallic, simple or complex oxides, of natural or synthetic origin, comprising at least one of the elements to be used, aluminum, titanium, as well as the impurities accompanying these elements, placed in suspension in a bath of melted salts, whose temperature assures the volatility of at least one of the metallic chlorides formed, said gaseous mixtures being put to work successively in the growing order of the chlorinating forces, as shown in the attached tables, by their injection into said bath, permit the successive extraction from this bath and in a very separate manner, of the metallic chlorides formed by each selective chlorination mixture of the given metallic oxides, by starting with the thermodynamically least stable metallic oxides and by finishing with the thermodynamically most stable metallic oxides.

In fact, the use of chlorinating mixtures in the decreasing order of their chlorinating force would lead to a result contrary to the selective chlorination. Thus, the use of the most powerful chlorination mixture, like Cl$_2$ gas+CO gas+HCl gas or COCl$_2$ gas+HCl gas, for the chlorination in a bath of melted salts, of a mixture of metallic oxides, would cause the chlorination of all the metallic oxides present and that way would no longer offer the selective nature of chlorination.

The method according to the invention is very pliable because, for the application of one of the special chlorinating mixtures it is possible to simultaneously extract from the chlorination bath, two or more metallic chlorides formed, separated further by one of the methods pertaining to the prior art. For example, if it is desirable to simultaneously extract the iron and titanium present in the melted salt bath by chlorination of their oxide, the chlorination mixture injected into said bath will be the one recommended for the chlorination of TiO$_2$, whose chlorinating force is sufficient to simultaneously cause the chlorination of the iron and titanium oxides.

The simple or complex metallic oxide mixtures, of natural or synthetic origin, including at least one of the elements to be applied, aluminum, titanium, iron and silicon, as well as the impurities accompanying the aforementioned elements which may be subjected to a separate chlorination in melted salt baths, include clays, bauxites, kaolins, silico-aluminous ores, such as oil or bituminous shales, red sludge, oxide concentrates, anorthosite, feldspath, and ilmenite. These oxide mixtures are generally subjected to a prior grinding so that their average particle size will be less than 150 microns.

The metallic oxide mixtures may be used as such or undergo a treatment prior to the selective chlorination, in order to eliminate therefrom at least part of the impurities present by any means with which the person skilled in the art is familiar.

The ground oxide mixtures are introduced and placed in suspension in the melted salt bath, constituted by at least one alkali metal and/or alkaline earth halide, carried to the adequate temperature and subjected to an agitation. Each selective chlorinating mixture then is blown into the melted bath in a quantity at least equal to the stoichiometry in relation to the metallic oxide to be chlorinated, and most often, greater than said quantity, in order to bring about the total chlorination of said oxide in the bath.

The metallic chloride produced in this manner is extracted as soon as the composition of the bath permits it. It then is entrained by the excess of the selective chlorinating mixture and the gases issuing from the chlorination, by forming a gaseous effluent. The metallic chloride extracted from the bath then is separated from this gaseous effluent by any appropriate means with which the person in the art is familiar, like, for example, by condensation of the metallic chloride vapor in a condensation chamber.

In the art, the method according to the invention comprises the following steps:

(a) grinding of the mixture of metallic oxides of natural or synthetic origin to a dimension of less than 150 microns;

(b) calcination of the mixture of ground oxides to eliminate the water present in the mixture of said oxides;

(c) introduction into the melted salt bath of the mixture of calcinated metallic oxides, which is put in suspension in this reactional medium;

(d) injection into the melted salt bath of the gaseous mixture assuring the selective chlorination of the iron oxides in a quantity at least equal to the stoichiometric quantity necessary for the complete chlorination in the form of $FeCl_3$ or $FeCl_6$ until the detection of the end of the gaseous extraction of $FeCl_3$ or $Fe_2Cl_6$.

(e) injection into the melted salt bath cleared of the iron oxides, of the selective chlorinating mixture of titanium oxide in a quantity at least equal to the stoichiometric quantity necessary for the complete chlorination in the form of $TiCl_4$ of the titanium oxide present in the bath, and this, until the detection of the end of the gaseous extraction of $TiCl_4$.

(f) injection into the melted salt bath cleared of the iron and titanium oxides of the selective chlorination mixture of the aluminum and silicon oxides in a quantity at least equal to the stoichiometric quantity necessary for the complete chlorination in the form of $AlCl_3$ and $SiCl_4$ of these oxides present in the bath and this until the complete detection of the end of the gaseous extraction of these two chlorides.

(g) separation by condensation of the aluminum and silicon chlorides.

The invention will be understood better by referring to the FIGURE which represents one of the possible cases, which illustrates the method according to the invention, of selective chlorination in baths of melted salts, of a bauxite containing essentially alumina, iron, titanium and silicon oxides.

According to the FIGURE, the bauxite ground finely to 150 microns and calcinated to a temperature allowing for almost the entirety of the water present, is placed in suspension in a melted salt bath constituted from a mixture of LiCl-KCl and maintained at a temperature above its melting point. A gaseous chlorinating mixture, constituted by HCl gas and water vapor is injected into the melted salt bath, causing only the chlorination, in the first step, of the iron present in the bath, until it is exhausted of this metal.

The gaseous effluents $G_1$ leaving the first chlorination step (A) formed by a mixture of $FeCl_3$, $Fe_2Cl_6$, HCl gas and $H_2O$ vapor then are introduced into the condenser (B) from where $FeCl_3$, $Fe_2Cl_6$ are extracted. When the gaseous effluents $G_1$ are impoverished in $FeCl_3$, $Fe_2Cl_6$ and become stripped of these compounds, the injection of the chlorinated mixture in this first phase is stopped.

The bath $L_{11}$ of melted salts, deprived of iron, but containing the titanium, aluminum and silicon oxides in suspension then is treated in (D) according to the second chlorination step.

The gaseous effluents $G_2$ originating from the condenser (B), constituted by the gaseous chlorinating mixture which did not react in (A), are introduced into a condenser (C) simultaneously with another gaseous mixture $G_3$ formed from $H_2$ and CO gas. At the outlet of this condenser (C), where the relative quantities of each one of the gaseous components are controlled, a gaseous effluent $G_4$ is collected, which is a chlorinating mixture intended for the second chlorination phase in (D) formed from the mixture of HCl gas, CO gas. The chlorinating mixture $G_4$ is then injected in (D), the second chlorination phase in the melted salt bath $L_{11}$, causing the only chlorination in this second phase of the titanium present in the bath until the exhaustion of the bath in this metal.

The effluents $G_5$ leaving the second chlorination step (D), formed from a mixture of $TiCl_4$ gas, HCl gas, CO gas, $H_2$ gas and $CO_2$ gas, produced during the reaction, are introduced into the condenser (E), from which the $TiCl_4$ is extracted.

When the gaseous effluents $G_5$ are shown to be stripped of $TiCl_4$, the injection of the chlorinating mixture $G_4$ is stopped.

The bath $L_{12}$ of melted salts, deprived of iron and titanium, but containing still in suspension the aluminum and silicon oxides is introduced in (F) in order to undergo there a third chlorination step.

The effluents $G_6$ originating from the condenser (E), constituted by the gaseous chlorinating mixture which did not react in (D) and by gases produced during the second chlorination phase, receive according to $G_7$ a mixture of CO gas and $Cl_2$ gas. The gaseous fractions $G_6$ and $G_7$ then form the chlorinating mixture $G_8$ intended for the third chlorination step in (F), formed from a mixture of CO gas, $Cl_2$ gas, HCl gas, as well as $H_2$ gas and $CO_2$ gas, produced during the second chlorination step.

The chlorination mixture $G_8$ then is injected in (F) into the melted salt bath $L_{12}$, causing the simultaneous chlorination of alumina and silica, present until these two oxides are exhausted in the bath.

The effluents $G_9$ leaving the third chlorination phase (F) formed from a mixture of $AlCl_3$ gas and $Al_2Cl_6$ gas, $SiCl_4$ gas, CO gas, $Cl_2$ gas, $HCl_2$ gas and $CO_2$ gas are introduced into the condenser (G) from which $AlCl_3$, $Al_2Cl_6$ and $SiCl_4$ are extracted.

When the gaseous effluents $G_9$ are shown to be devoid of $AlCl_3$, $Al_2Cl_6$ gas and $SiCl_4$ gas, the injection of the chlorinating mixture $G_8$ is suspended.

The bath $L_{13}$ leaving the third chlorination step (F) is shown to be practically devoid of iron, titanium, aluminum and silicon, and is, along with its initial components, that is the melted mixture of LiCl, KCl, ready to be recycled to the first chlorination step (A).

The effluents $G_{10}$ originating from the condenser (G) then are conducted into a treatment zone not shown.

The method according to the invention may be practiced either intermittently or continuously, depending on the types of oxide mixtures to be chlorinated. The gaseous effluents, following condensation of the metallic chlorides, may be reinjected as such or with readjustment of their composition, or they may be treated separately.

EXAMPLE

According to the selective chlorination method, which is the subject matter of the invention, an ore constituted by a bauxite was treated which had the following composition in % by weight:

| | |
|---|---|
| $Al_2O_3$ | 58.1% |
| $Fe_2O_3$ | 6.7% |
| $TiO_2$ | 2.5% |
| $SiO_2$ | 4.0% |
| $H_2O$ | 28.4% |
| Miscellaneous compounds | .3% |

1 kilogram of this ore, calcinated at 650° C. and finely crushed to an average particle size of 150 microns was placed in suspension in a melted salt bath of the first selective chlorination step.

The composition of this bath in molar % was as follows:

| LiCl | 58.8% |
|------|-------|
| KCl  | 41.2% | and its operating temperature was 470° C.

The melted salt bath was located in a Pyrex glass chlorination reactor with a serviceable capacity of 10 liters.

Said reactor itself was placed into a heated enclosure provided with an adjustment apparatus of the temperature of the reactional medium in such a manner that the temperature was maintained between 465° C. and 475° C. The melted salt bath occupied about ⅔ of the serviceable capacity of said reactor.

The suspension of the ore in said bath was subjected to a mechanical agitation of abut 100 rpm.

Finally, the chlorination reactor was also provided with a device permitting the introduction and diffusion of the specific gaseous chlorination mixtures.

In a first chlorination step, a gaseous chlorinating mixture was introduced into the bath at a pressure near the atmospheric pressure; said mixture was constituted by the mixture HCl gas and $H_2O$ vapor, the composition of which was defined by the following partial pressures:

Partial pressure of HCl gas: P(HCl)g=0.99 bar
Partial pressure of $H_2O$ vapor: P($H_2O$)v=0.01 bar This chlorinating mixture was introduced into the bath at the rate of 100 milliliters/minute.

A release of gaseous effluents formed from $FeCl_3$ and $Fe_2Cl_6$ vapors and the excess of HCl gas and $H_2O$ vapor, initially introduced or produced during the chlorination then was noted. Said effluents were then conducted into a condenser maintained at a temperature ranging between 150° C. and 200° C. A fraction of these gaseous effluents was condensed in the form of a solid composed practically of 100% $FeCl_3$, while the other fraction HCl gas and $H_2O$ vapor was treated by passing it into a second condenser cooled to a temperature below 70° C. Thus the largest part of the water produced was collected and the HCl which did not react was recovered.

This first selective chlorination step of iron oxide was conducted as far as the disappearance of any condensation of $FeCl_3$. A sampling was then carried out in the melted salt bath, whose complete chemical analysis revealed that practically all the initially present iron had been chlorinated selectively.

In a second chlorination step, the melted salt bath contained in suspension the following metallic oxides: $TiO_2$, $Al_2O_3$, $SiO_2$. Then a selective chlorinating gas formed from HCl gas, CO gas and $H_2O$ gas was introduced into said bath under a pressure close to the atmospheric pressure; the composition of said mixture was defined by the following partial pressures:

Partial pressure of HCl gas: P(HCl)=0.45 bar
Partial pressure of $H_2O$ gas: P($H_2$) 0.1 bar
Partial pressure of CO gas : P(CO)=0.45 bar This chlorinating mixture was introduced into the bath at the rate of 100 milliliters/minute.

A release of gaseous effluents formed from $TiCl_4$ vapors and the excess of HCl gas, CO gas and $H_2$ gas initially introduced or produced during the chlorination was then noted, as well as of the $CO_2$ as produced. Said effluents then were condensed in a condenser maintained at a temperature ranging between 50° C. and 70° C. A fraction of these gaseous effluents was condensed in the form of a liquid composed practically of 100% $TiCl_4$, while the other fraction (HCl gas, CO gas, $H_2$ gas and $CO_2$ gas) was treated separately.

This second selective chlorination phase of titanium oxide was conducted until the disappearance of the entire condensation of $TiCl_4$.

Like in phase 1, a sampling was taken in the melted salt bath, whose complete chemical analysis demonstrated that practically the entire amount of titanium initially present had been chlorinated selectively.

In a final chlorination phase, the melted salt bath contained in suspension only aluminum and silicon oxides. They were chlorinated at a pressure close to the atmospheric pressure by means of a gaseous mixture formed from $COCl_2$ and HCl gas, whose composition was defined by the following partial pressures:

Partial pressure of $COCl_2$ gas: P($COCl_2$)=0.9 bar
Partial pressure of HCl gas: P(HCl)=0.1 bar This chlorinating mixture was introduced into the bath at the rate of 100 mililiters/minute.

Then a release of gaseous effluents was noted, formed from $AlCl_3$, $Al_2Cl_6$ and $SiCl_4$ vapors and $COCl_2$ gas, CO gas, $Cl_2$ gas and $CO_2$ gas which was produced during the chlorination.

These effluents were conducted into a first condenser maintained at a temperature ranging between 100° and 120° C. so as to cause the condensation of the solid aluminum chloride, then into a second condenser maintained at a temperature of less than 30° C. in order to cause the condensation of the liquid silicon tetrachloride.

The non-condensed effluents were collected and treated separately.

A final sampling was taken in the melted salt bath, whose analysis demonstrated that practically the total amount of alumina and the silica present initally had been chlorinated.

TABLE I

| Metal OXIDES classified by increasing thermodynamic stability | Order of Operations | Selective Mixture of Chlorination | Partial Operating Pressures for each component of the chlorinating mixture and possible supplement to the operating pressure by an inert gas |
|---|---|---|---|
| $Fe_2O_3$ | 1 | HCl gas + $H_2O$ vapor or | P(HCl) = 0.1 to 1 bar, preferably ranging between 0.7 and 1 bar P($H_2O$ vapor) <0.1 P (HCl) |
| | | $Cl_2$ gas + $O_2$ gas + HCl gas | P($Cl_2$) = .1 to 1 bar, preferably .7 to 1 bar P($O_2$) <.1 bar and preferably <.001 bar P(HCl) <.01 bar preferably = .01 bar |
| $TiO_2$ | 2 | HCl gas + CO gas + $H_2$ gas | P(HCl) ranging between .45 and .1 bar P(CO) ranging between .45 and .1 bar P($H_2$) ranging between .05 and .15 bar, preferably = .1 bar |
| $Al_2O_3$ | 3 | $Cl_2$ gas + CO gas + HCl gas | P($Cl_2$) and P(CO) ranging between .01 and .5 bar P(HCl) <1 bar |

TABLE I-continued

| Metal OXIDES classified by increasing thermodynamic stability | Order of Operations | Selective Mixture of Chlorination | Partial Operating Pressures for each component of the chlorinating mixture and possible supplement to the operating pressure by an inert gas |
|---|---|---|---|
| | | or COCl$_2$ gas + HCl gas | P(COCl$_2$) ranging between .01 and 1 bar P(HCl) < 1 bar |

TABLE II

| Metal OXIDES classified by increasing thermodynamic stability | Order of Operations | Selective Mixture of Chlorination | Partial Operating Pressures for each component of the chlorinating mixture and possible supplement to the operating pressure by an inert gas |
|---|---|---|---|
| Al$_2$O$_3$ called reactive | 1-1 | Selective Mixture of Chlornation | P(HCl) ranging between .1 and 1 bar, preferably between .3 and .9 bar P(H$_2$) ranging between .01 and .9 bar, and preferably between .05 and 2 bar |
| Iron oxides reduced to a degree of oxydation II in chloride form by means of operation 1-1 | 1-2 | Cl$_2$ gas + O$_2$ gas | P(Cl$_2$) ranging between .01 and 1 bar P(O$_2$) <.1 bar and preferably <.01 bar |
| TiO$_2$ | 2 | HCl + CO gas + H$_2$ gas | P(HCl) ranging between .45 and .8 bar P(C)) ranging between .45 and .1 bar P(H$_2$) ranging between .05 and .15 bar, preferably also = .1 bar |
| Al$_2$O$_3$ | 3 | Cl$_2$ gas + CO gas + HCl gas or | P(Cl$_2$) and P(CO) ranging between .01 and .5 bar P(HCl) <1 bar |
| SiO$_2$ | | COCl$_2$ gas + HCl gas | P(COCl$_2$) ranging between .01 and 2 bar P(HCl) <1 bar |

We claim:

1. A method for the selective chlorination of a mixture of simple or complex metallic oxides of iron, titanium, aluminum and silicon, wherein said mixture is ground, calcined, and placed in suspension in a bath of melted salts, comprising, in a first step, injecting into said bath a chlorination mixture selected from the group consisting of (a) the mixture of HCl gas and H$_2$O vapor, and (b) the mixture of Cl$_2$ gas, O$_2$ gas and HCl gas, to selectively chlorinate the iron oxide and then extracting the ferric chloride produced, in a second step, injecting into said bath a chlorination mixture of HCl gas, CO gas and H$_2$ gas to selectively chlorinate the titanium oxide and then extracting the titanium chloride produced, and in a third step, injecting into said bath a chlorination mixture selected from the group consisting of a (a) the mixture of C$_2$ gas, CO gas and HCl gas, and (b) the mixture of COCl$_2$ gas and HCl gas to chlorinate the aluminum and silicon oxides and then extracting the aluminum chloride and silicon chloride produced.

2. The method according to claim 1 wherein, for the chlorinating mixture of HCl gas and H$_2$O vapor of the first step, the partial pressure of HCl is between 0.1 and 1 bar and the partial pressure of H$_2$O vapor is at most equal to 0.1 times the partial pressure of the HCl.

3. The method according to claim 2 wherein the partial pressure of HCl is between 0.7 and 1 bar.

4. The method according to claim 1 wherein, for the chlorinating mixture of Cl$_2$ gas, O$_2$ gas and HCl gas of the first step, the partial pressure of Cl$_2$ is between 0.1 and 1 bar, the partial pressure of O$_2$ is at most equal to 0.1 bar, and the partial pressure of HCl is at most equal to 0.01 bar.

5. The method according to claim 4 wherein, the partial pressure of Cl$_2$ gas is between 0.7 and 1 bar.

6. The method according to claim 1 wherein, for the chlorinating mixture of HCl gas, CO gas and H$_2$ gas of the second step, the partial pressure of HCl is between 0.45 and 0.8 bar, the partial pressure of CO is between 0.45 and 0.1 bar, and the partial pressure of H$_2$ is between 0.05 and 0.15 bar.

7. The method according to claim 6 wherein, the partial pressure of H$_2$ is equal to 0.1 bar.

8. The method according to claim 1 wherein, for the chlorinating mixture of Cl$_2$ gas, CO gas and HCl gas of the third step, the partial pressure of Cl$_2$ is between 0.01 and 0.5 bar, the partial pressure of CO is between 0.01 and 0.5 bar, and the partial pressure of HCl is below 1 bar.

9. The method according to claim 1 wherein, for the clorinating mixture of COCl$_2$ gas and HCl gas of the third step, the partial pressure of COCl$_2$ is between 0.01 and 1 bar and the partial pressure of HCl is below 1 bar.

10. The method for selective chlorination of a mixture of simple or complex metallic oxides, of natural or sythetic origin, comprising oxides of iron, titanium, aluminum and silicon, and reactive alumina, wherein said mixture is ground, calcined, and placed in suspension in a bath of melted salts, comprising, in a first step, injecting into said bath a chlorination mixture of HCl and H$_2$ to selectively chlorinate the reactive alumina, and then extracting the aluminum chloride produced, in a second step, injecting onto said bath a chlorination mixture of Cl$_2$ gas and O$_2$ gas to selectively chlorinate the iron oxide and then extracting the ferric chloride produced, in a third step, injecting into said bath a chlorination mixture of HCl gas, CO gas and H$_2$ gas to selectively chlorinate the titanium oxide and then extracting the titanium chloride produced and in a fourth step, injecting into said bath a chlorination mixture selected from the group consisting of (a) the mixture of Cl$_2$ gas, CO gas and HCl gas, and (b) the mixture of COCl$_2$ gas HCl gas, to chlorinate the aluminum and silicon oxides and then extracting the aluminum chloride and silicon chloride produced.

11. The method according to claim 10 wherein, for the chlorinating mixture of HCl gas and H$_2$ gas of the first step, a partial pressure of HCl is between 0.1 and 1 bar and the partial pressure of H$_2$ is between 0.01 and 0.9 bar.

12. The method according to claim 11 wherein, the partial pressure of HCl is between 0.3 and 0.9 bar.

13. The method according to claim 11 wherein, the partial pressure of H$_2$ is between 0.05 and 0.2 bar.

14. The method according to claim 10 wherein, for the chlorinating mixture of Cl$_2$ gas and O$_2$ gas of the second step, the partial pressure of Cl$_2$ is between 0.01 and 1 bar and the partial pressure of O$_2$ is at most equal to 0.1 bar.

15. The method according to claim 10 wherein, for the chlorinating mixture of HCl gas, CO gas and $H_2$ of the third step, the partial pressure of HCl is between 0.45 and 0.8 bar, the partial pressure of CO is between 0.45 and 0.1 bar and the partial pressure of $H_2$ is between 0.05 and 0.15 bar.

16. The method according to claim 15 wherein, the partial pressure of $H_2$ is equal to 0.1 bar.

17. The method according to claim 10 wherein, for the chlorinating mixture of $Cl_2$ gas, CO gas and HCl gas of the fourth step, the partial pressure of $Cl_2$ is between 0.01 and 0.5 bar, the partial pressure of CO is between 0.01 and 0.5 bar and the partial pressure of HCl is below 1 bar.

18. The method according to claim 10 wherein, for the chlorinating mixture of $COCl_2$ gas and HCl gas of the fourth step, the partial pressure of $COCl_2$ is between 0.01 and 1 bar and the partial pressure of HCl is below 1 bar.

* * * * *